US007566007B2

(12) United States Patent
Aoki et al.

(10) Patent No.: US 7,566,007 B2
(45) Date of Patent: Jul. 28, 2009

(54) PHYSICAL DISTRIBUTION MANAGEMENT SYSTEM AND METHOD FOR CUSTOMIZED PRODUCTS

(75) Inventors: Junichi Aoki, Minamiashigara (JP); Toshio Watanabe, Minamiashigara (JP); Noriko Torigoe, Minamiashigara (JP)

(73) Assignee: Fuji Xerox Co., Ltd, Tokyo (JP)

( * ) Notice: Subject to any disclaimer, the term of this patent is extended or adjusted under 35 U.S.C. 154(b) by 514 days.

(21) Appl. No.: 11/117,030

(22) Filed: Apr. 28, 2005

(65) Prior Publication Data

US 2006/0131379 A1    Jun. 22, 2006

(30) Foreign Application Priority Data

Dec. 21, 2004    (JP)    ............................. 2004-369880

(51) Int. Cl.
*G06K 17/00*    (2006.01)
(52) U.S. Cl. ........................ 235/386; 235/383; 235/384; 235/385
(58) Field of Classification Search .................. 235/383, 235/384, 385, 386
See application file for complete search history.

(56) References Cited

U.S. PATENT DOCUMENTS

| 6,332,062 | B1 | 12/2001 | Phillips et al. | |
|---|---|---|---|---|
| 6,494,562 | B1 | 12/2002 | Walker et al. | |
| 6,557,758 | B1 | 5/2003 | Monico | |
| 7,142,121 | B2 * | 11/2006 | Chan et al. | ............... 340/572.8 |
| 2003/0171843 | A1 | 9/2003 | Okamura | |
| 2005/0237200 | A1 * | 10/2005 | Bellum et al. | ............. 340/572.8 |
| 2006/0054682 | A1 * | 3/2006 | de la Huerga | ............... 235/375 |

FOREIGN PATENT DOCUMENTS

| FR | 2744391 | 8/1997 |
|---|---|---|
| JP | 2003-50931 | 2/2003 |
| WO | WO 02/061578 | 8/2002 |

OTHER PUBLICATIONS

EPO Office Action dated Dec. 22, 2006, relating to corresponding EP Application No. 05009587.6-1238.

* cited by examiner

*Primary Examiner*—Karl D. Frech
(74) *Attorney, Agent, or Firm*—Gauthier & Connors LLP (57) ABSTRACT

A physical distribution system comprises a tag writer device provided in a manufacturing facility for manufacturing common products to be supplied to a plurality of destinations, that writes related information concerning a product into a wireless tag included in the product, and a distribution facility system provided at a distribution facility, for determining a destination for the product and for shipping the product to the determined destination. The distribution facility system comprises a customized indication information acquiring device that acquires basic indication information corresponding to the determined destination of the product, a tag reader device that reads out the related information of the product from the wireless tag included in the product, a print information generator device that generates a label print information including the basic indication information acquired by the customized indication information acquiring device and the related information read out by the reader device, and a printer device that reads, on the product or on a label to be attached to the product, the label print information generated by the print information generator device.

18 Claims, 5 Drawing Sheets

Fig. 1

| PRODUCT FAMILY (FAMILY CODE) | INDIVIDUAL PRODUCTS (PRODUCT CODE) |
|---|---|
| A | a1 |
|  | a2 |
|  | a3 |
|  | ⋮ |
|  | aN |
| B | b1 |
|  | b2 |
|  | ⋮ |
| ⋮ | ⋮ |

PHYSICAL DISTRIBUTION MANAGEMENT SYSTEM AND METHOD FOR CUSTOMIZED PRODUCTS

BACKGROUND OF THE INVENTION

1. Field of the Invention

The present invention relates to a technique for managing physical distribution of customized products.

2. Description of the Related Art

Many products, such as toner cartridges and other consumable supplies for copiers, are constructed from identical hardware but are then customized for supply to different destinations (such as different machine models, destination countries, and OEMs). Conventionally, such customized products are typically packaged by manufacturing facilities in different packages provided corresponding to the respective destinations. In the subsequent physical distribution stages, the packaged products are managed as different products having discrete model numbers for the respective destinations.

However, when managing otherwise identical products for different destinations as different products greatly and disadvantageously increases the workload at the manufacturer's warehouses and other storage and distribution facilities. Further, the likelihood of a particular item going out of stock will increase because it is necessary to maintain a separate stock for each of the different destinations.

In recent years, product traceability is regarded as a significant issue in many fields, such as the food industry. Traceability refers to storing a record for a product concerning its source of raw materials, manufacturer, distributed destinations, and the like, and making it possible for consumers and producers to refer to the record, such that the product and its information can be traced. By establishing traceability, investigation into causes of a problem can be facilitated, and defective products can be easily traced and recalled. In this manner, consumer confidence with respect to product safety, quality, and the like can be assured.

For example, in a facility for manufacturing consumable supplies for a copier, a process of attaching on a package (individual packing box) a sticker having a barcode or the like indicating traceability information is performed in order to establish traceability.

Further, in a facility for manufacturing consumable supplies for a copier or the like, a number of other stickers indicating information such as the expiration date of a consumable supply item are attached to a package, because such information are determined during the manufacturing process and therefore cannot be printed in advance on the package. Additional stickers indicating information which are determined at a stage within the distribution channel may further be attached to the package.

It is not just in relation to consumable supplies for a copier, but for products in many fields, it is necessary to attach, on product packages, information determined at different stages of fabrication and distribution, as described above. As significant costs is incurred for each such attaching processes, reduction of these costs is desired.

SUMMARY OF THE INVENTION

The present invention provides a system which enables simplification of a process for labeling various information on a product package.

A physical distribution system according to the present invention comprises a tag writer device provided in a manufacturing facility for manufacturing common products to be supplied to a plurality of destinations. The tag writer device writes related information concerning a product into a wireless tag included in the product. The physical distribution system further comprises a distribution facility system provided at a distribution facility. The distribution facility system determines a destination for the product, and ships the product to the determined destination. The distribution facility system comprises a customized indication information acquiring device that acquires basic indication information corresponding to the determined destination of the product, a tag reader device that reads out the related information of the product from the wireless tag included in the product, a print information generator device that generates a label print information including the basic indication information acquired by the customized indication information acquiring device and the related information read out by the reader device, and a printer device that prints, on the product or on a label to be attached to the product, the label print information generated by the print information generator device.

BRIEF DESCRIPTION OF THE DRAWINGS

An embodiment of the present invention will be described in detail based on the following figures, wherein.

DESCRIPTION OF THE PREFERRED EMBODIMENT

An embodiment of the present invention will next be described referring to the drawings.

Figure 1:
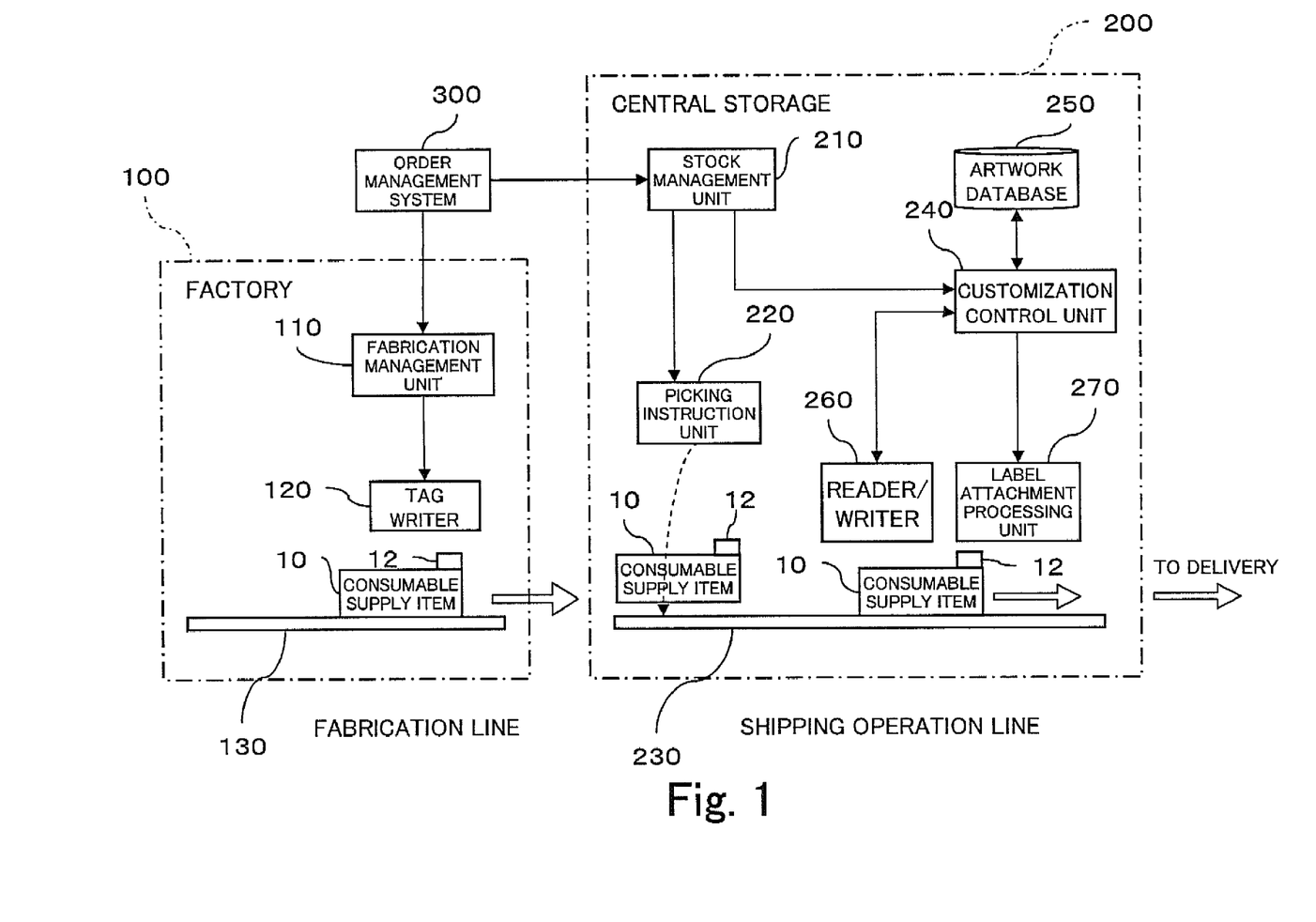
FIG. 1 is a functional block diagram showing a configuration of a physical distribution management system according to the present invention.

FIG. 1 is a functional block diagram showing a configuration of a physical distribution management system according to the present invention. The physical distribution management system is described below referring to an example case in which the system is applied to distribution of consumable supplies 10 for copiers and the like.

The example physical distribution management system shown in FIG. 1 comprises a system within a factory 100 for manufacturing the consumable supplies 10, a system within a central storage 200 for storing the consumable supplies 10 manufactured in the factory 100, and an order management system 300.

The order management system 300 performs operations such as receiving orders for the consumable supplies 10, issuing instructions for shipping the consumable supplies to the central storage 200 in accordance with the orders, generating a production plan based on a record of past orders and the like, and instructing the factory 100 to manufacture according to the generated production plan. The orders are received directly from customers, and from distributors such as sales companies, agents, and OEM (original equipment manufacturer) companies.

A memory unit is often attached to a consumable supply item 10. The memory unit serves to store parameter data that are read out by a copier when the consumable supply item is installed in the copier, and to store data (such as a count value denoting the amount of use) that are written by the copier. Very recently, there is proposed a system in which a wireless tag (RFID tag) 12 is employed as the above-described memory unit, such that reading and writing of the data by the copier can be performed via radio transmission. The wireless tag 12 may be attached to the consumable supply item itself or to a package (such as an individual packing box) of the consumable supply item.

Consumable supplies 10 such as toner cartridges having identical hardware structures are often supplied for a plurality of copier models and to multiple countries and OEMs. The machine models to which the consumable supplies 10 are adapted and the countries and OEMs to which the consumable supplies 10 are delivered are collectively referred to hereinafter as "destinations". While the consumable supply items may be identical to one another in terms of hardware, the items can be customized to corresponding destinations by employing, as the information such as parameter of use stored in the memory units (wireless tags 12) of the consumable supply items, individual data which are appropriate for the respective models, countries, and OEMs.

Figure 2:
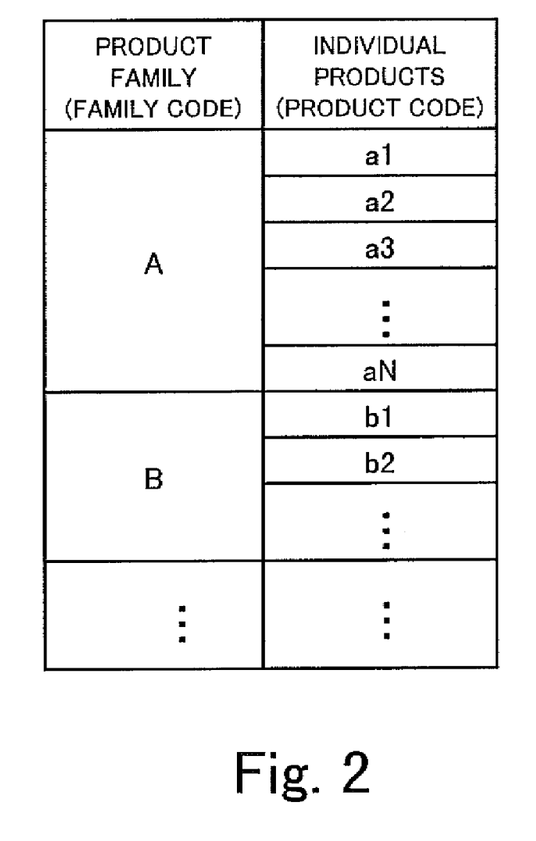
FIG. 2 is a table showing the relationship between a product (consumable supply) family and individual customized products.

According to the present embodiment, a group of consumable supplies which have a common hardware structure for use at a plurality of destinations is identified as one family, and a unique family code is assigned thereto. Further, a consumable supply item 10 which has been tuned to a corresponding destination is assigned with a product code which is an identification information for an individual destination within the family. In other words, as shown in FIG. 2, the consumable supplies having a hardware structure denoted by family code "A" are eventually divided according to destinations into N product types denoted by product codes "a1" through "aN". In general, consumable supplies having different hardware structures and belonging to a plurality of different families A, B, and so on are fabricated and stored by the factory 100 and the central storage 200.

According to the present embodiment, the factory 100 delivers the consumable supplies 10 to the central storage 200 after the components among the overall structure of the consumable supplies 10 which are common to the plurality of destinations are completed. In this example, components which are common to the plurality of destinations include, for example, the hardware main body (including the wireless tags 12) of the consumable supplies 10, and the data stored in each wireless tag 12 which are common items that are independent of destinations. The common data items that are independent of destinations may include the family code of the consumable supplies 10, an identification code denoting the factory or the fabrication line in which the consumable supplies 10 are manufactured, the date of manufacture, the lot number, and the like. Furthermore, various fabrication information (which may include the above-noted identification code denoting the manufacturing plant) may be registered in a traceability management system as a part of traceability information. In this case, a traceability code for identifying the registered traceability information is typically assigned to the consumable supplies 10, and this traceability code may be written in the wireless tags 12 at the factory 100 as a component of destination-independent data. The recommended expiration date of the consumable supplies 10 may also be written at the factory 100. The main body of each consumable supply items 10 is packaged at the factory 100 using a common package for the plurality of destinations. This package is also a part of the above-described common components of the consumable supplies 10. The common package may be a blank box without any printing, or a packaging material printed with a common, destination-independent design.

At the factory 100, a fabrication management unit 110 performs known production management processing according to production plan information supplied from the order management system 300 and the like. Under this production management system, the consumable supplies 10 are assembled and packed on the fabrication line 130. Further, the fabrication management unit 110 controls a tag writer 120 provided on the fabrication line 130, such that the destination-independent information (specific examples are given above) which are already determined at this stage are written into the wireless tags 12 of the consumable supplies 10 being transported on the fabrication line 130. The consumable supplies 10 in the destination-independent state completed in this manner are delivered to and stored in the central storage 200.

A management system of the central storage 200 comprises a stock management unit 210, picking instruction unit 220, customization control unit 240, artwork database 250, reader/writer unit 260, and a label attachment processing unit (labeler) 270.

The stock management unit 210 controls the consumable supplies 10 that were delivered from the factory 100. The picking instruction unit 220 serves to instruct picking operations by which the consumable supplies 10 to be shipped are retrieved from a storing location and placed on a shipping operation line 230. The customization control unit 240 controls a processing (or tuning) performed in accordance with information on intended destinations for the consumable supplies 10 in the destination-independent state retrieved from the storing location. This customizing processing for the respective destinations includes, for example, using the reader/writer unit 260 to write information unique to each destination into the wireless tags 12, and using the label attachment processing unit 270 to attach customized labels corresponding to the respective destinations.

Destination-dependent information to be written into a wireless tag 12 may include the product code of the consumable supply item 10 which is determined according to its destination, and various control parameter data which depend on the destination.

Figure 3:
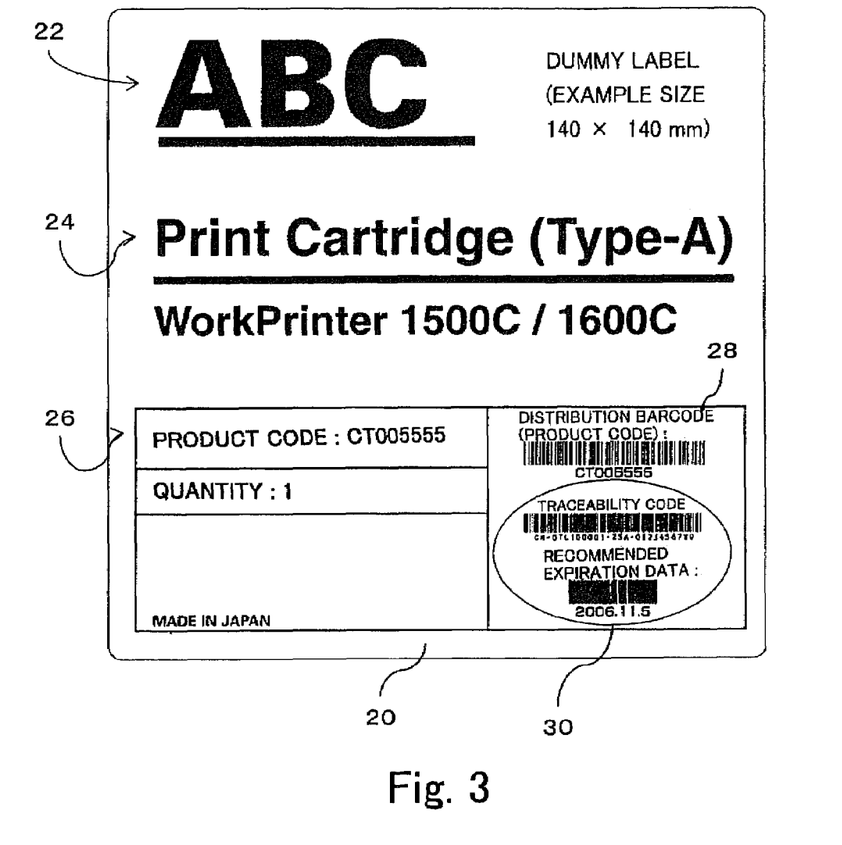
FIG. 3 shows an example of a label attached to a customized consumable supply item.

An example of the customized label 20 is shown in FIG. 3. The label 20 is generally composed of two main elements.

Figure 4:
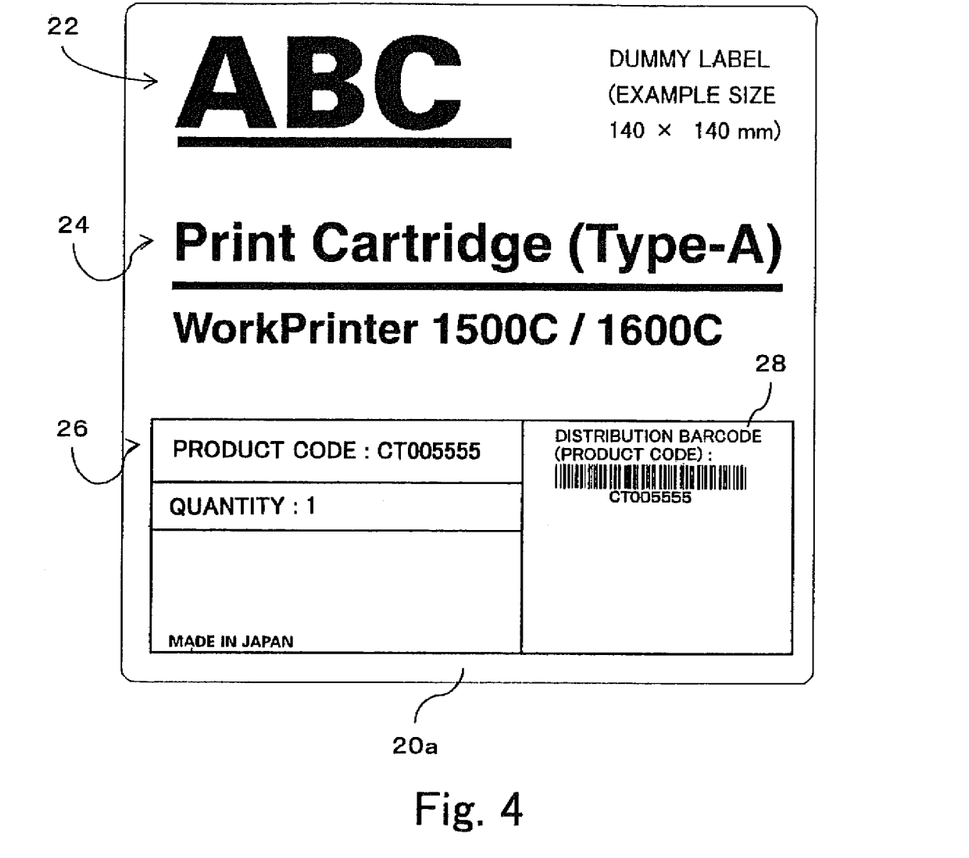
FIG. 4 shows an example of a basic design (artwork) of a customization label.

The first element is the artwork portion which shows the indication information for each customized supply item. As shown in FIG. 4, the artwork portion 20a includes a company logo 22 related to the company which supplies the consumable supply item 10, a name portion indicating the type and applicable machine model of the consumable supply item 10, the product code of the consumable supply item 10, and a distribution barcode 28 which indicates the product code. The artwork portion 20a is uniquely determined by a combination of the family and destination of the consumable supply item 10. Print information required for printing the artwork portion 20a is registered in the artwork database 250.

The second element shown on the label 20 is the information such as traceability information and the expiration date which are read out from the wireless tag 12 of the consumable supply item 10. In FIG. 3, the traceability code and the expiration date code indicated in the region 30 under the distribution barcode 28 correspond to the read-out information.

In summary, the central storage 200 stores destination-independent consumable supplies 10 which were delivered from the factory 100, and the above-described system of the central storage 200 tunes (or processes) the stored consumable supplies into customized consumable supplies for the respective destinations. An example of flow of the shipping operation performed by the system of the central storage 200 will next be described.

The stock management unit 210 of the central storage 200 occasionally receives from the order management system 300 a shipping instruction according to orders. The shipping instruction indicates, for example, the product code and quantity of the consumable supplies to be shipped. A product code is determined by a combination of the family and destination of a consumable supply item. Accordingly, the family code of the family to which a consumable supply item belongs can be conversely identified from the product code of the consumable supply item. The stock management unit 210 calculates, separately for every family, the total quantity of consumable supply items designated by product codes in the shipping instruction. The stock management unit 210 then determines a shipping schedule in which an arrangement is made as to how many of the items of each family are assigned to which shipping operation lines at which time periods. The determined shipping schedule is provided as an instruction to the picking instruction unit 220. The picking instruction unit 220 may display the shipping schedule on a screen or print out the shipping schedule, such that a picking personnel can recognized the shipping schedule. As instructed by the shipping schedule, the picking personnel retrieves, from the storing location within the storage, a designated quantity of consumable supply items belonging to a designated family, and places the retrieved items on a designated shipping operation line 230. It should be noted that an automated system which executes the above-described picking operation may alternatively be employed.

The consumable supply items 10 placed on the shipping operation line 230 are transported to the reader/writer 260 and the label attachment unit 270, so as to be subjected to processing required for modifying the items into customized products. This customization processing is executed under control of the customization control unit 240. The steps for this processing will next be described referring to FIG. 5.

Figure 5:
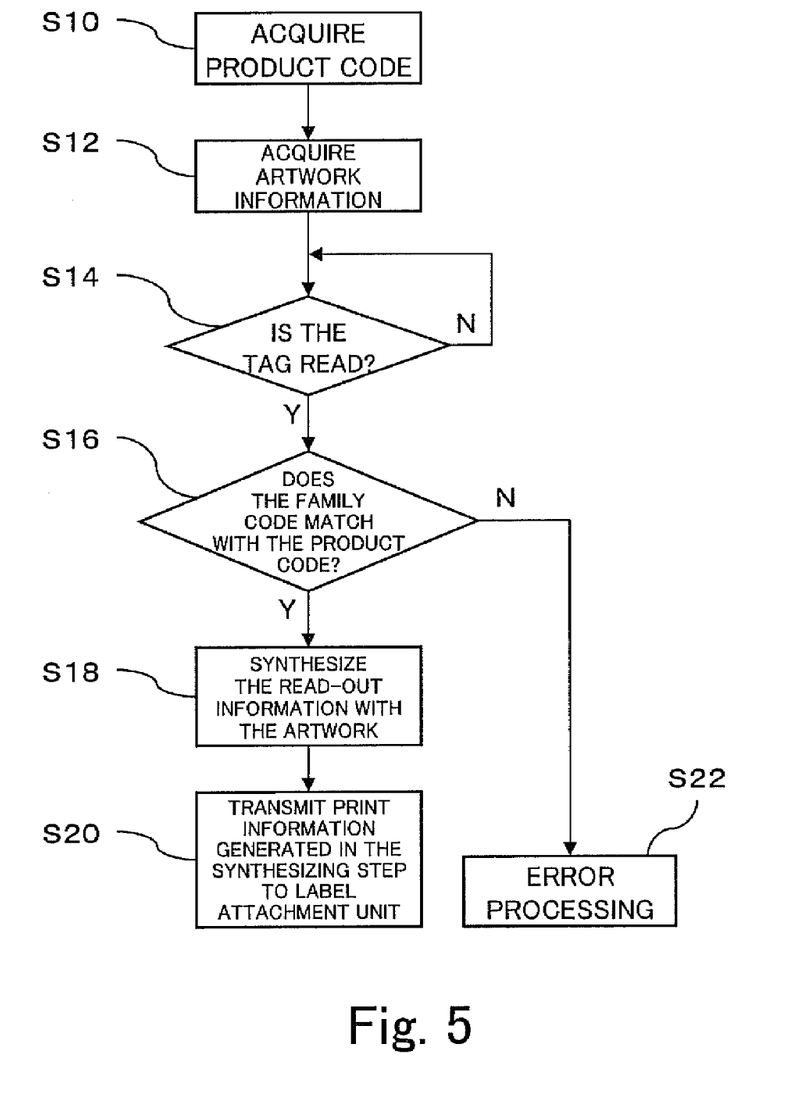
FIG. 5 is a flowchart showing the processing steps of a customization control unit.

The customization control unit 240 first acquires from the stock management unit 210 the product code of the customized consumable supplies 10 which are to be prepared at this point (S10). The customization control unit 240 then acquires from the artwork database 250 the artwork information (namely, information to be indicated on the label) corresponding to the acquired product code (S12). Subsequently, the customization control unit 240 waits until the reader/writer 260 reads a wireless tag 12 of a consumable supply item 10 being transported on the shipping operation line 230 (S14). When a wireless tag 12 is read, the customization control unit 240 compares the family code included in the read-out information to the product code acquired in S10, and judges whether the two codes are in a matching relationship (S16). This judgment may be performed using a table as shown in FIG. 2. When the two codes are not in a matching relationship, it is clear that the currently-selected consumable supply item 10 cannot be modified into a customized consumable supply item having the product code (that is, an incorrect item was placed on the shipping operation line 230). Accordingly, a predetermined error processing is executed (S22), which may include interrupting the operation of the shipping operation line 230 and notifying generation of the error to an operation manager. When it is judged in S16 that the family code and the product code are in a matching relationship, the customization control unit 240 writes the above-described destination-dependent information such as the product code in the wireless tag 12 via the reader/writer 260. Further, the customization control unit 240 generates an image showing predetermined information such as the traceability code which should be indicated on the label 20, and synthesizes the generated image with the artwork image acquired in S12 (S18). The customization control unit 240 subsequently transmits the synthesized image to the label attachment processing unit 270. According to the instruction from the customization control unit 240, the label attachment processing unit 270 prints the synthesized image on a label, and attaches the label at a predetermined location on the package of the consumable supply item 10 (S20). By writing the destination-dependent information in the wireless tag 12, and attaching on the consumable supply item 10 the customized label having incorporated therein the information such as the traceability code which are generated during the fabrication processes at the factory 100, the consumable supply item 10 is modified into a customized product which can be supplied to the designated destination. The customized product is subsequently delivered to the destination.

As described above, according to the present embodiment, the consumable supplies 10 can be stored in the central storage 200 in the common product form without being customized for the respective destinations. As a result, it is possible to reduce the overall reasonable stock quantity as compared to when stock is separately maintained for each of the respective destinations.

Further, according to the present embodiment, the information generated in the factory 100 such as the traceability information and the expiration date which must be shown on the package of the consumable supply item 10 are once written into the wireless tag 12 along with other information. Subsequently, when processing the consumable supply item 10 at the central storage 200 for customization, the information generated during fabrication are synthesized and printed with the artwork image of the customized label. As such, according to the present embodiment, because information such as traceability information, which are generated during the fabrication processes and which are not directly related to destinations, are synthesized and printed with the customized label, the processes related to attaching labels (stickers) for indicating various information on the consumable supplies 10 can advantageously be simplified. For example, the process of attaching a sticker indicating traceability information as conventionally performed at the factory 100 becomes unnecessary because this process can be integrated with the label attachment processing performed at the central storage 200. As a result, the number of manufacturing processes can be reduced.

Moreover, according to the present invention, information which must be incorporated in a label 20 to be attached on a consumable supply item 10 are written into the wireless tag 12 included in the consumable supply item 10, and, when producing the label 20, the information is read out from the wireless tag 12 so as to be included in the label 20. With this arrangement, tracking of correlating information between consumable supplies 10 and information to be incorporated in corresponding labels is unnecessary, making it possible to reduce management workload. The traceability information of the consumable supply item 10 related to stages between the factory 100 and the central storage 200 can be acquired by reading the wireless tag 12.

It should be noted that the above embodiment is described by way of example only, and that various modifications are possible within the scope of the present invention. For example, while a label 20 is printed and attached to a consumable supply item in order to customize the destination-independent consumable supply item in the above-described example, an image equivalent to the image which should be shown on the label 20 may alternatively be printed directly on a package (such as an individual packing box) of the consumable supply item.

While information such as the traceability information which are generated during the processes at the factory 100 are synthesized with the basic image (artwork) of a customized label in the above-described example, it is also possible to synthesize other data into the customized label. For example, data which are generated at different stages during transportation from the factory 100 to the central storage 200 (or during any processing performed in the meantime) may be written into the wireless tag 12 of a consumable-supply item 10 at the respective stages, and the data may be subsequently synthesized into the customized label.

The disclosure of Japanese Patent Application No. 2004-369880 filed on Dec. 21, 2004 including the specification, claims, drawings, and abstract is incorporated herein by reference in its entirety.

What is claimed is:

1. A physical distribution system, comprising:
   a tag writer device provided at a manufacturing facility for manufacturing common products to be supplied to a plurality of destinations, that writes related information concerning a product into a wireless tag included in a product; and
   a distribution facility system provided at a distribution facility, for determining a destination for the product and for shipping the product to the determined destination;
   wherein the distribution facility system comprises:
      a customized indication information acquiring device that acquires basic indication information corresponding to the determined destination of the product;
      a tag reader device that reads out the related information of the product from the wireless tag included in the product;
      a print information generator device that generates label print information including the basic indication information acquired by the customized indication information acquiring device and the related information read out by the reader device; and
      a printer device that prints, on the product or on a label to be attached to the product, the label print information generated by the print information generator device.

2. A physical distribution system as defined in claim 1, wherein the related information concerning the product includes fabrication information which indicates history of fabrication of the product.

3. A physical distribution system as defined in claim 1, wherein the related information concerning the product includes expiration date information of the product.

4. A physical distribution system as defined in claim 1, further comprising: a second tag writer device provided at a facility between the manufacturing facility and the distribution facility, that writes related information concerning the product which is generated at this facility into the wireless tag included in the product; wherein the print information generator device generates the label print information further including the related information which is written into the wireless tag by the second tag writer device.

5. A physical distribution system as defined in claim 1, wherein the tag writer device writes, into the wireless tag included in the product, a classification code assigned to the common products to be supplied to the plurality of destinations; and the distribution facility system further comprises a match judgment processor that determines whether a matching relationship exists between the classification code read out by the tag reader device from the wireless tag of the product and the determined destination of the product, and that performs a predetermined error processing when no matching relationship is determined.

6. A printing system for printing customized label print information on a product which is in a common, destination-independent format or on a label to be attached to the product, the printing system comprising:
   a customized indication information acquiring device that acquires information concerning a destination of the product and basic indication information corresponding to the destination of the product;
   a tag reader device that reads out related information of the product from a wireless tag included in the product; and
   a print information generator device that generates label print information including the basic indication information acquired by the customized indication information acquiring device and the related information read out by the reader device;
   wherein the printing system prints, on the product or on a label to be attached to the product, the label print information generated by the print information generator device.

7. A physical distribution method, comprising:
   (a) writing related information concerning a product into a wireless tag included in the product by means of a tag writer device provided in a manufacturing facility for manufacturing common products to be supplied to a plurality of destinations; and
   (b) tuning the product in accordance with its destination, at a distribution facility for determining a destination for each of the common products to be supplied to a plurality of destinations and shipping the products to determined destinations; wherein the tuning step includes:
      (b1) acquiring basic indication information corresponding to the destination of the product by means of a customized indication information acquiring device;
      (b2) reading out related information of the product from the wireless tag included in the product by means of a tag reader device;
      (b3) generating, by means of a print information generator device, label print information including the basic indication information acquired by the customized indication information acquiring device and the related information read out by the reader device; and
      (b4) printing, on the product or on a label to be attached to the product, the label print information generated by the print information generator device.

8. A physical distribution method as defined in claim 7, wherein the related information concerning the product includes fabrication information which indicates history of fabrication of the product.

9. A physical distribution method as defined in claim 7, wherein the related information concerning the product includes expiration date information of the product.

10. A physical distribution method as defined in claim 7, further comprising: between the step (a) and the step (b), a step of writing, by means of a second tag writer device provided at a facility between the manufacturing facility and the distribution facility, related information concerning the product which is generated at this facility into the wireless tag included in the product; wherein in the step (b3), the print information generator device generates the label print information further including the related information which is written in the wireless tag by the second tag writer device.

11. A physical distribution system, comprising:
   a tag writer device that writes related information concerning a product into a wireless tag included in the product;

an information acquiring device that acquires basic indication information corresponding to a destination of the product;

a tag reader device that reads out the related information of the product from the wireless tag included in the product;

a print information generator device that generates label print information including the basic indication information acquired by the information acquiring device and the related information read out by the reader device; and a printer device that prints, on the product or on a label to be attached to the product, the label print information generated by the print information generator device.

12. A physical distribution system as defined in claim 11, wherein the related information concerning the product includes fabrication information which indicates history of fabrication of the product.

13. A physical distribution system as defined in claim 11, wherein the related information concerning the product includes expiration date information of the product.

14. A physical distribution system as defined in claim 11, wherein the tag writer device writes, into the wireless tag included in the product, a classification code assigned to the common products to be supplied to the plurality of destinations; and the physical distribution system further comprises a match judgment processor that determines whether a matching relationship exists between the classification code read out by the tag reader device from the wireless tag of the product and the shipping destination of the product, and performs a predetermined error processing when no matching relationship is determined.

15. A printing system for printing customized label print information on a product or on a label to be attached to the product, the printing system comprising:

an information acquiring device that acquires information concerning a destination of the product and basic indication information corresponding to the destination of the product;

a tag reader device that reads out related information of the product from a wireless tag included in the product; and a print information generator device that generates label print information including the basic indication information acquired by the information acquiring device and the related information read out by the reader device; and a printer device that prints, on the product or on a label to be attached to the product, the label print information generated by the print information generator device.

16. A physical distribution method, comprising:

writing related information concerning a product into a wireless tag included in the product;

acquiring basic indication information corresponding to a destination of the product;

reading out the related information of the product from the wireless tag included in the product;

generating label print information including the acquired basic indication information and the readout related information; and printing, on the product or on a label to be attached to the product, the label print information.

17. A physical distribution method as defined in claim 16, wherein the related information concerning the product includes fabrication information which indicates history of fabrication of the product.

18. A physical distribution method as defined in claim 16, wherein the related information concerning the product includes expiration date information of the product.

* * * * *